F. C. DEVERICKS.
PROCESS FOR MAKING GASOLENE.
APPLICATION FILED AUG. 3, 1915.
1,260,970. Patented Mar. 26, 1918.
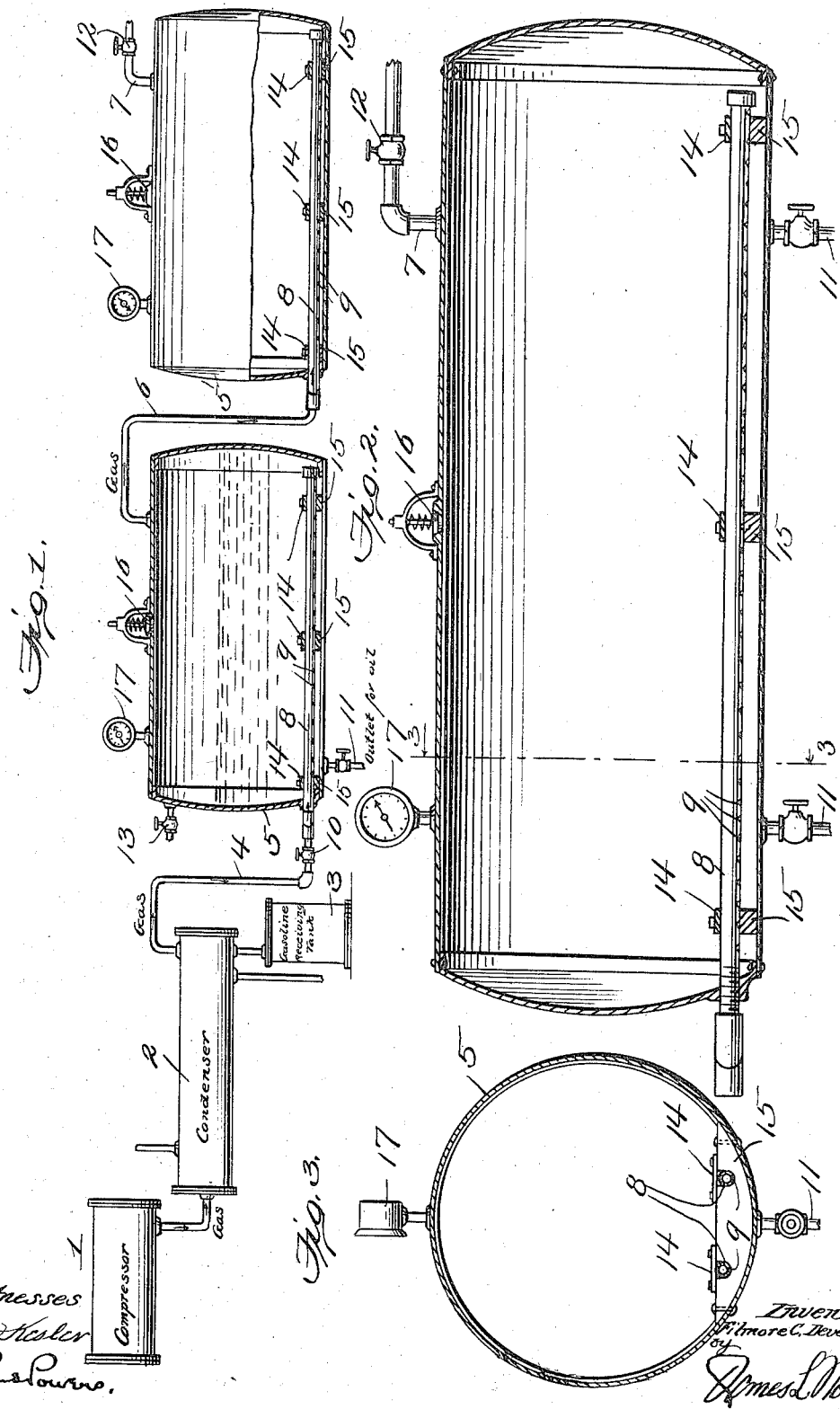

UNITED STATES PATENT OFFICE.

FILMORE C. DEVERICKS, OF CLARKSBURG, WEST VIRGINIA, ASSIGNOR OF ONE-HALF TO LYNN S. HORNOR, OF CLARKSBURG, WEST VIRGINIA.

PROCESS FOR MAKING GASOLENE.

1,260,970. Specification of Letters Patent. Patented Mar. 26, 1918.

Application filed August 3, 1915. Serial No. 43,450.

*To all whom it may concern:*

Be it known that I, FILMORE C. DEVERICKS, a citizen of the United States, residing at Clarksburg, in the county of Harrison and State of West Virginia, have invented new and useful Improvements in Processes for Making Gasolene, of which the following is a specification.

This invention relates to an improved process for the manufacture of a liquid hydrocarbon, specifically gasolene, suitable for use in internal combustion engines, from natural gas from oil walls, *i. e.* the so-called "casing-head" gas.

In the ordinary production of gasolene from casing-head gas, the gas is first passed through a compressor and thereafter is condensed, yielding a gasolene of about 85° B. gravity which is not suitable for ordinary commercial applications owing to the practical difficulties in the way of its preservation and of its safe transportation or storage. To adapt the gasolene thus obtained from the condensation of casing-head gas for ordinary commercial applications, it is customary to mix it with naphtha in a sufficient quantity to reduce its gravity to about 70° B.

The principal objects of the present invention are to provide a process for obtaining gasolene from casing-head natural gas, of suitable gravity for ordinary commercial applications, particularly for use as a fuel for gas engines, which shall be much simpler and less expensive to practise than the ordinary process wherein naphtha is employed; which yields an increased quantity of gasolene; wherein the constituents used for reducing the gravity of the high-proof gasolene obtained from the condensation of the gas are themselves obtained from the gas in a continuous manner, that is, as the gas passes from the field to the service line; and whereby the value of the gas for ordinary commercial applications is not appreciably impaired.

With the above objects in view, the invention consists more particularly in passing the gas, as it leaves the condenser, through one or a system of absorbers charged with a low grade liquid hydrocarbon of about 40° B. gravity in such manner that the gas during its passage through the absorber or system or absorbers yields some of its yet remaining constituents of lighter gravity than the hydrocarbon in the absorbers with the result that after a time the gravity of the liquid in the absorbers is raised from 40° B. to between 50° and 54° B. and the amount of the liquid in the absorbers is increased by fifty per cent. When the liquid in the absorbers attains a gravity of between 50° and 54° B. it is withdrawn from the absorbers and mixed with the gasolene of 85° B. gravity obtained from the condensation of the gas in such proportions as to give a gasolene of about 70° B. gravity which is suitable for ordinary commercial applications and may be handled and stored with the same facility as gasolene made by the ordinary naphtha process above described.

The manner in which the process is performed will be understood by a consideration of the accompanying drawings wherein:

Figure 1 is a diagrammatic view showing apparatus for carrying the process into effect;

Fig. 2 is a detail longitudinal sectional view showing an absorber of preferred construction;

Fig. 3 is a detail cross-sectional view of the absorber on the line 3—3 of Fig. 2.

Similar characters of reference designate corresponding parts throughout the several views.

The present invention is not particularly concerned with the treatment of the gas prior to the condensation thereof and is applicable alike to gas which is compressed before its passage to the condenser and to gas which is passed directly to the condenser without the intermediate step of compression. Where the gas is to be used for commercial applications and the required pressure in the gas lines is greater than the existing natural pressure, the gas should be passed through a compressor before reaching the condenser.

The drawings assume a system wherein the gas is passed through a compressor of suitable form, shown at 1, and thereafter passes to a suitably constructed condenser 2, from which the high grade gasolene having a minimum gravity of approximately 85° B. is discharged into one or more recovery tanks 3.

According to the present invention, the gas is carried from the condenser by a pipe 4 to an absorption system which may include one or a plurality of absorption tanks 5. Where more than one tank 5 is employed, they are preferably arranged tandem, although they may be arranged otherwise. The drawings show two tanks 5 connected by a pipe 6 through which the gas flows from the first tank into the second tank, the latter having a gas discharge pipe 7 by which the gas passes to the service line or to some other agency for further treatment thereof.

The pipes 4 and 6 are provided with a suitable number of branches 8 which extend adjacent to the bottoms or lower sides of the tanks 5 and are formed with relatively minute openings 9 through which the gas discharges into the tanks. As shown, the pipes 4 and 6 are each provided with two branches 8.

The low grade oil used in the tanks may be of various kinds. Its gravity should preferably be about 40° B. The oil used in the tanks 5 to absorb the lighter or more volatile constituents of the gas is produced by the distillation of petroleum and is the residual product resulting from the recovery of lighter hydrocarbons, such as gasolene, kerosene, benzin or heavy naphtha. This oil is generally referred to as "gas oil" or "300 oil". While "gas oil" of the character above described is preferably used in the tanks 5, it is practical to use naphtha or kerosene or any non-viscous oil.

When the liquid in the tanks 5 attains a gravity of between 50° and 54° B. the flow of gas is interrupted by closing a suitable valve 10 conveniently located in the pipe 4 and the liquid is thereupon drained from the tanks 5 through a valve controlled outlet 11. Before draining the liquid, however, the absorption system should be cut off from the service lines and the gas remaining in the tank or tanks 5 should be vented. The absorption system is cut off from the service lines by closing a valve 12 conveniently located in the pipe 7, and the gas in the tank or tanks 5 is vented by opening manually operated relief valves 13 with which said tanks are provided.

The liquid of between 50° and 54° B. gravity recovered from the tanks 5 is mixed with the nearly pure gasolene of approximately 85° B. gravity recovered by the condensation of the gas, reducing the gravity thereof to 70° B., more or less.

Notwithstanding the loss of some of its volatile hydrocarbons during its passage through the absorption system, the gas which flows through the pipe 7 is sufficiently rich to be well adapted for a number of ordinary commercial applications.

The gas during its passage through the oil in the tanks 5 not only raises the gravity of the oil as above described, but also increases the quantity thereof about fifty per cent. Consequently, where the tanks are originally charged with, for example, twenty gallons of oil, there will be about thirty gallons of oil of between 50° and 54° B. recovered from the tanks for mixture with the high-proof gasolene discharged into the receptacles 3.

The absorption apparatus employed may be of any suitable construction. That shown, however, is preferred. The pipes 8 are preferably secured in one of the heads of the tank 5 and at intervals throughout the length of the tank are secured by plates 14 to anchorage blocks 15, in turn, secured to the wall of the tank. In this way, it is assured that the pipes 8 shall be held closely adjacent the bottom of the tank 5 and that the gas issuing through the openings 9 shall pass completely through the oil in the tanks. With this object in view, the openings 9 are preferably located at the under sides of the pipes 8.

The tanks 5 may be equipped with any suitable adjuncts for promoting safety and facilitating observations, such, for example, as a safety valve 16 and a thermometer or pressure gage 17.

I claim:

The process of obtaining a hydrocarbon liquid suitable for use in explosive engines from casing head natural gas which consists in condensing casing head natural gas and recovering liquid hydrocarbons of approximately 85° B. gravity therefrom, of absorbing certain hydrocarbon constituents of the gas remaining subsequent to the condenastion thereof in a body of low grade oil to obtain a resultant oil of higher gravity than said low grade oil and of mixing the resultant oil obtained from the absorption step with the above mentioned hydrocarbons of 85° B. gravity whereby the said resultant oil and the said liquid hydrocarbons will homogeneously blend in a liquid of approximately 70° B. gravity.

In testimony whereof I have hereunto set my hand in presence of two subscribing witnesses.

FILMORE C. DEVERICKS.

Witnesses:
 TRUMAN J. LYNCH,
 HOMER STROSNIDER.